(12) United States Patent
Oskotsky et al.

(10) Patent No.: US 7,768,642 B2
(45) Date of Patent: Aug. 3, 2010

(54) WIDE FIELD COMPACT IMAGING CATADIOPTRIC SPECTROMETER

(75) Inventors: Mark Oskotsky, Mamaroneck, NY (US); Michael J. Russo, Jr., Roslyn, NY (US); Dipak Banerjee, Setauket, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 484 days.

(21) Appl. No.: 11/799,531

(22) Filed: May 2, 2007

(65) Prior Publication Data

US 2008/0273244 A1 Nov. 6, 2008

(51) Int. Cl.
  *G01J 3/28* (2006.01)
(52) U.S. Cl. .................................... 356/328
(58) Field of Classification Search ............... 356/326, 356/328, 305, 334
See application file for complete search history.

(56) References Cited

U.S. PATENT DOCUMENTS

| | | | |
|---|---|---|---|
| 5,159,199 A * | 10/1992 | LaBaw | 250/339.02 |
| 6,977,727 B2 | 12/2005 | Lerner | 356/328 |
| 6,980,295 B2 | 12/2005 | Lerner | 356/328 |
| 6,985,226 B2 | 1/2006 | Lerner | 356/328 |
| 7,006,217 B2 | 2/2006 | Lerner | 356/328 |
| 7,016,037 B2 | 3/2006 | Chrisp et al. | 356/328 |
| 7,016,038 B2 | 3/2006 | Chrisp et al. | 356/328 |
| 7,041,979 B2 | 5/2006 | Chrisp | 250/339.07 |
| 2007/0171415 A1* | 7/2007 | Chrisp | 356/328 |

* cited by examiner

*Primary Examiner*—Tarifur Chowdhury
*Assistant Examiner*—Abdullahi Nur
(74) *Attorney, Agent, or Firm*—Fattibene & Fattibene; Paul A. Fattibene

(57) ABSTRACT

An imaging catadioptric spectrometer using a Mangin type lens and pupil lens adjacent to a grating. Electromagnetic radiation received by aperture slits is directed to a reflective portion of a Mangin type lens and redirected to a pupil adjacent a diffraction grating. Diffracted light is transmitted through a refractive portion of the Mangin type lens and through a corrector lens to image the spectral components of electromagnetic radiation onto a detector. The detector may be an enhanced detector utilizing an array of smaller spaced detectors. By balancing the powers of the lens elements, a single optical material may be used. In one embodiment, multiple aperture slits are spaced apart and decentered with respect to the optical axis permitting collection of opposing diffraction orders on two detectors. A wide field of view having a low F number is obtained with an operating wavelength range in the infrared from approximately 7.5 to 13.5 microns. The spectrometer is particularly suited to airborne applications.

33 Claims, 8 Drawing Sheets

WIDE FIELD COMPACT IMAGING CATADIOPTRIC SPECTROMETER

FIELD OF THE INVENTION

The present invention relates in general to a spectrometer, and more particularly to a compact wide field imaging spectrometer and an enhanced efficient detector array.

BACKGROUND OF THE INVENTION

Spectrometers are often used to remotely determine the composition of or the physical properties of an object. A spectrometer collects reflected light or electromagnetic radiation from an object and separates the collected light or electromagnetic radiation into spectral components or separate wavelengths. The separate wavelengths are detected and are generally unique for a material or element. By analyzing the resultant spectrum, the properties of the object may be determined and the object may be identified. There is an increasing need to remotely identify objects, especially for the purpose of security so as to detect potentially dangerous objects, such as explosives or toxins. Accordingly, there has been much development in this field.

A spectrometer is disclosed in U.S. Pat. No. 6,977,727 issuing to Lerner on Dec. 20, 2005 and entitled Compact Imaging Spectrometer Utilizing Immersed Gratings. Therein disclosed is an imaging spectrometer having an entrance slit and a lens for refracting the light and delivering the light to an immersion diffraction grating. The diffracted light is again refracted and focused by the lens on the detector.

Another spectrometer is disclosed in U.S. Pat. No. 6,980,295 issuing to Lerner on Dec. 27, 2005 and entitled Compact Catadioptric Imaging Spectrometer Utilizing Reflective Grating. Therein disclosed is an imaging spectrometer having an entrance slit, an aspheric lens, grating, and detector.

Another spectrometer is disclosed in U.S. Pat. No. 6,985,226 issuing to Lerner on Jan. 10, 2006, and entitled Compact Imaging Spectrometer Utilizing an Immersed Grating and Anamorphic Mirror. Therein disclosed is an imaging spectrometer having an entrance slit, an anamorphic mirror, a grating, and a detector array.

Yet another spectrometer is disclosed in U.S. Pat. No. 7,006,217 issuing to Lerner on Feb. 28, 2006 and entitled Compact Catadioptric Imaging Spectrometer Utilizing Immersed Gratings. Therein disclosed is a spectrometer having an entrance slit, a catadioptric lens, a grating that diffracts the light back to the catadioptric lens and a detector.

Another spectrometer is disclosed in U.S. Pat. No. 7,016,037 issuing to Chrisp et al on Mar. 21, 2006 and entitled Imaging Spectrometer Utilizing Immersed Gratings With Accessible Entrance Slit, which is herein incorporated by reference. Therein disclosed is an imaging spectrometer, an entrance slit, a catadioptric lens with a mirrored surface, a grating, and a detector array. In one embodiment, an additional lens of zinc selenide is placed between the catadioptric lens made of germanium and the detector.

Yet another spectrometer is disclosed in U.S. Pat. No. 7,016,038 issuing to Chrisp et al on Mar. 21, 2006 and entitled Compact Imaging Spectrometer Utilizing Immersed Gratings. Therein disclosed is an imaging spectrometer having a dioptric lens in combination with an immersion diffraction grating that compensates for optical distortions.

Yet another spectrometer is disclosed in U.S. Pat. No. 7,041,979 issuing to Chrisp on May 9, 2006 and entitled Compact Reflective Imaging Spectrometer Utilizing Immersed Gratings. Therein disclosed is an imaging spectrometer using at least two mirrors.

Even though there has been substantial development in the field of imaging spectrometers recently, there is a need to continuously improve performance. Specifically, there is a need to provide a compact and efficient imaging spectrometer that has a relatively large field of view and that has an enhanced F-number.

SUMMARY OF THE INVENTION

In one embodiment of the invention, a spectrometer having an optical system imaging spectra onto a detector system that utilizing relatively low cost easily produced detectors. A detector array is arranged such that the detector array or image of spectral components on the array may be scanned so as to detect the different spectral components of an object.

Accordingly, it is an object of this embodiment to enhance the performance of a spectrometer with an enhanced efficient detector.

It is an advantage of this embodiment that a large effective field is created with smaller detectors.

It is a feature of this embodiment that staggered detectors form the detector array and signal processing is used to obtain the desired spectral component information.

In a second embodiment of the present invention, an optical system using a Mangin type lens, a double path pupil lens, an immersed grating, and a corrector lens is used to image spectral components of electromagnetic radiation received by multiple aperture slits onto multiple detectors. Accordingly, it is an object of this second embodiment to increase the field of view and provide enhanced imaging.

It is an advantage of this second embodiment that the optical system has a low F-number.

It is a feature of this embodiment that a double path pupil lens is placed between the Mangin type lens and the immersed grating.

It is another feature of this second embodiment that multiple staggered and separated aperture slits are used to receive the illumination from the object.

In a third embodiment of the present invention, a symmetrical optical system having a Mangin type lens, a double path pupil lens, and a diffraction grating are configured such that the grating is positioned between two slits and the positive diffraction orders are collected at a first detector and the negative diffraction orders are collected at a second detector.

It is an object of this third embodiment to provide a compact spectrometer.

It is an advantage of this third embodiment that it is easily packaged and has a relatively wide field of view.

It is a feature of this third embodiment that the positive and negative diffraction orders are used and that the optical axis is substantially centered between the two aperture slits.

In yet another fourth embodiment of the present invention, a single aperture slit may be used to receive illumination from the object. In the single aperture slit embodiment, a Mangin type lens reflects illumination to a pupil lens which is received by a grating that diffracts the electromagnetic radiation for a second path through the pupil lens and through the refractive portion of the Mangin type lens and through a corrector lens to the detector.

It is an object of this fourth embodiment to provide a relatively simple compact design of an imaging spectrometer with relatively wide slit and low F-number.

It is an advantage of this fourth embodiment that a single detector may be used.

It is a feature of this fourth embodiment that a single aperture slit is used.

It is a feature of the present invention that a pupil lens is placed adjacent the grating.

It is another feature of the present invention that the balancing of powers of the lens elements makes possible the use of a single material for all the refractive lens elements.

These and other objects, advantages, and features will become readily apparent in view of the following more detailed description.

DETAILED DESCRIPTION OF THE PREFERRED EMBODIMENTS

Figure 1:
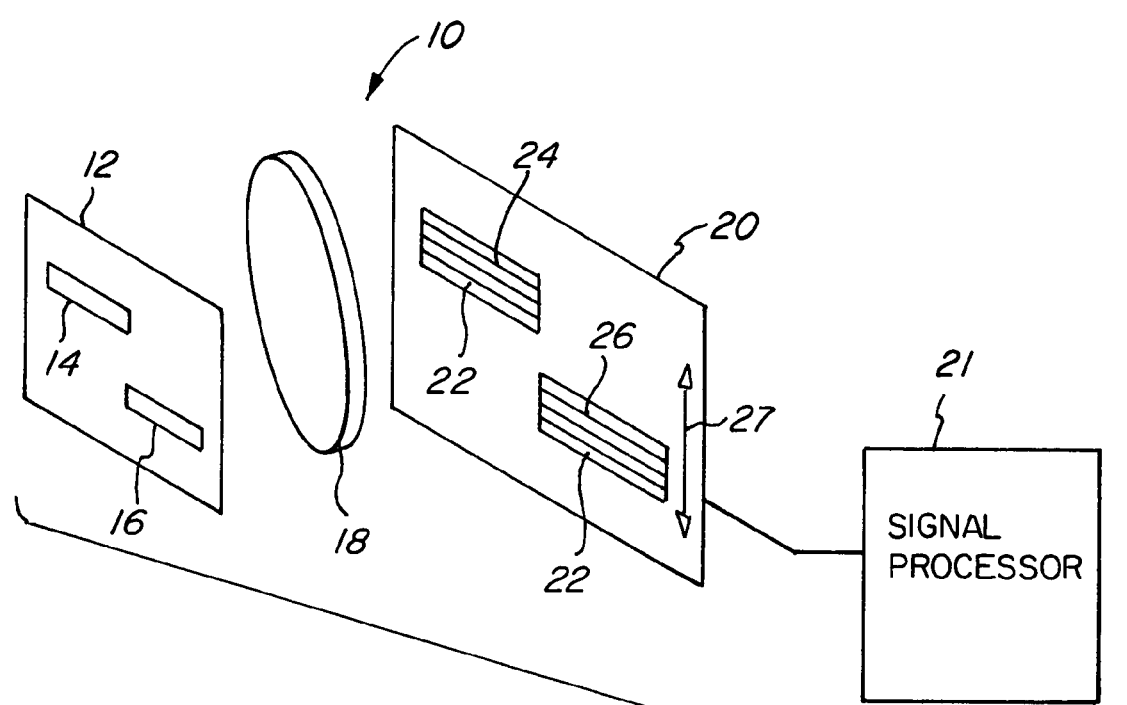
FIG. 1 schematically illustrates an imaging spectrometer using an enhanced efficient detector system.

FIG. 1 schematically illustrates an embodiment of the present invention relating to an enhanced efficient detector system utilizing a staggered detector array. An imaging spectrometer 10 has a field of view 12 with a first aperture slit 14 and a second aperture slit 16. An optical system 18, which may contain a diffraction grating, separates the electromagnetic radiation or light waves into their spectral components or different wavelengths and images them onto the detector arrays 22, forming a plurality of spectral components represented by lines 24 and 26. The spectral components represented by lines 24 are obtained from electromagnetic radiation entering the first aperture slit 14. Similarly, lines 26 represent the spectral components of the electromagnetic radiation entering second aperture slit 16. The detector arrays 22 of the detector system 20 are formed by a staggered array of smaller detectors that may have spaces there between. Accordingly, to enhance the efficiency of the array of smaller detectors, the spectral components 24 and 26 are scanned in the direction of arrow 27 such that all the information contained in the spectral components 24 and 26 are detected or recorded. Signal processor 21 is used to time shift the representative signals obtained during scanning of the spectral components 24 and 26. The scanning may be accomplished optically by a tilted mirror or other known optical device for shifting the spectral components 24 and 26, or alternatively the detector arrays 22 may be spatially moved or shifted.

Figure 2:
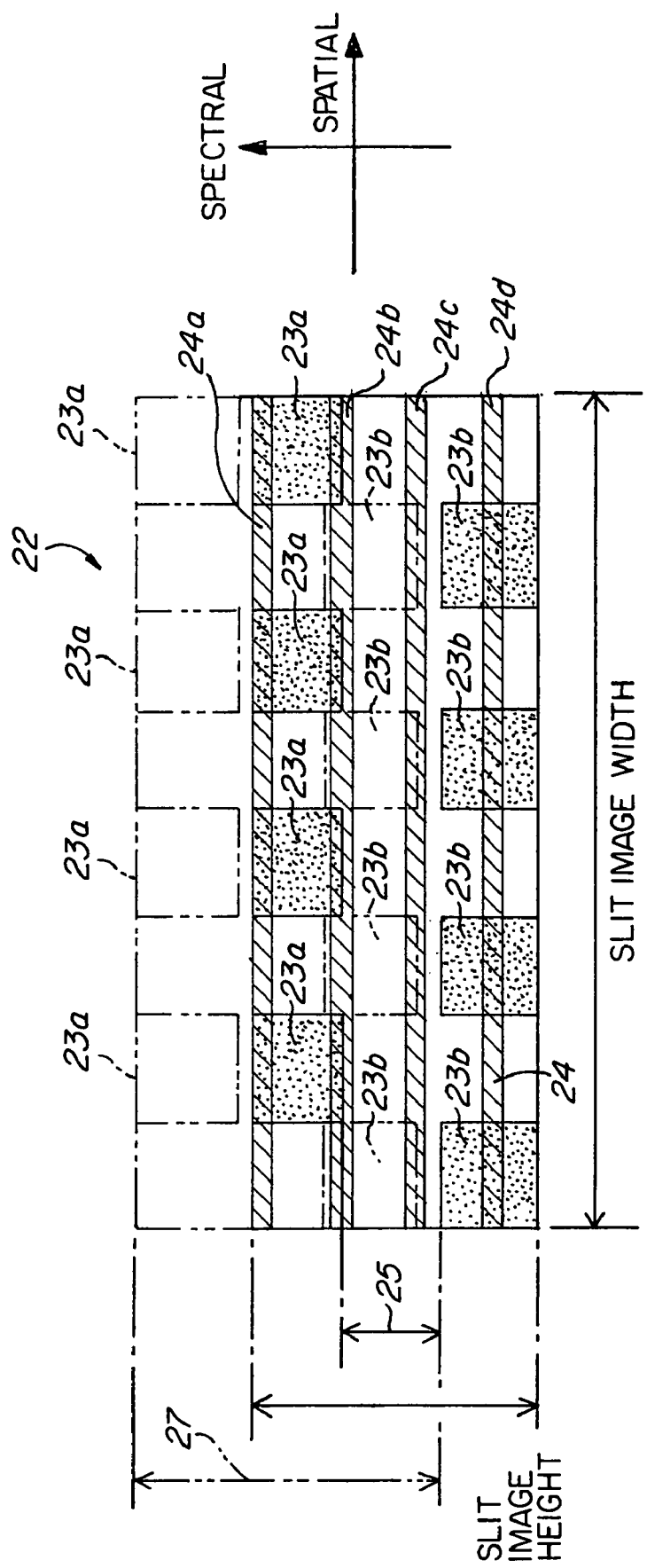
FIG. 2 is a plan view of an enhanced efficient detector system utilizing a staggered detector array.

FIG. 2 is a plan view illustrating an efficient staggered-detector array 22 illustrated schematically in FIG. 1. The detector array 22 is comprised of a plurality of spaced smaller detectors consisting of an upper row of detectors 23a and a lower row of detectors 23b. The configuration of the detector array may have a checkerboard pattern. Four spectral component lines 24a-d are illustrated as an example. A horizontal gap 25 represented by arrow 25 is formed between the upper row of detectors 23a and the lower row of detectors 23b. To obtain the spectral component information in the horizontal gap 25, the detectors are effectively shifted in the direction of the effective scan arrow 27 such that the detectors 23b are effectively positioned within the horizontal gap 25. The detectors 23a and 23b may be physically shifted, or the detectors 23a and 23b may be stationery and the image of the spectral component lines 24a-24d may be optically shifted relative to the detector 23a and 23b. Accordingly, the detector system 22 illustrated in FIG. 2 makes use of smaller, less expensive detectors 23a and 23b and yet provides information over a much larger area encompassing the slit image width and the slit image height. In this way, a more efficient and less costly detector system 22 is obtained that can effectively detect the spectral component lines 24a-d in a larger area at a reduced cost compared to a single large detector.

Figure 3:
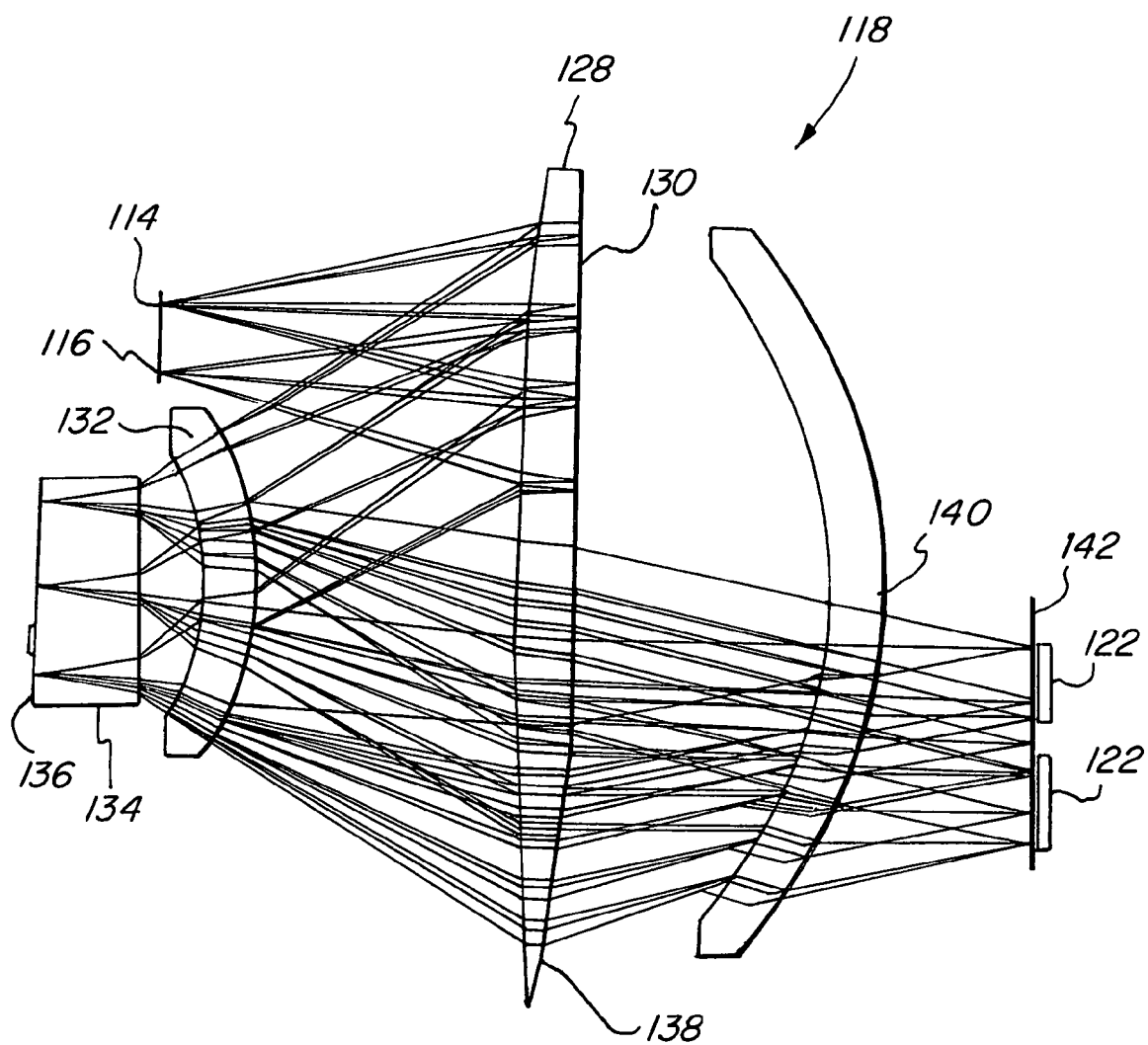
FIG. 3 schematically illustrates an imaging spectrometer optical system using two offset aperture slits.

FIG. 3 schematically illustrates an embodiment of the present invention of an optical system 118 used for an enhanced field imaging spectrometer. A first upper slit 114 and a second lower slit 116 receives illumination or electromagnetic radiation from an object. The first upper slit 114 and the second lower slit 116 may be offset or separated in two different directions, for example along an X-axis direction and a perpendicular Y-axis direction. Typically, the electromagnetic radiation is in the infrared spectrum and may range for example, in the long wave region from 7.5 to 13.5 microns. The electromagnetic radiation is initially received by a Mangin type lens 128. A Mangin type lens is one that has a refracting surface that corrects aberrations introduced by a reflecting surface. The Mangin type lens 128 has a reflective portion 130 adjacent a refracting surface. The reflective portion 130 reflects the electromagnetic radiation to a pupil lens 132. The pupil lens 132 images the electromagnetic radiation onto an immersion diffraction rating 134 at the aperture stop 136. The pupil lens 132 bends towards the Mangin type lens 128. The diffracted electromagnetic radiation from the immersion diffraction grating 134 passes again through the pupil lens 132 and is transmitted to a refractive portion 138 of the Mangin type lens 128. The pupil lens 132 may be considered a double path pupil lens. The electromagnetic radiation then passes through a corrector lens 140 and is imaged onto a focal or image plane 142 and received by detectors 122. The detectors 122 may be a detector system, as illustrated in FIG. 2, having a staggered detector array or may be comprised of two separate detectors or a single large detector. The Mangin type lens 128, pupil lens 132, and immersion grating 134 may all be made of germanium. The corrector lens 140 may also be made of zinc selenide or germanium. Additionally, the lens element may have a balance of powers that permit all the lens elements, including the corrector lens 140, to be made of a single material, such as germanium. The pupil lens 132 greatly facilitates the balancing of powers so as to permit use of a single material while achieving wide field of view along with a low F-number.

For example, the refractive lens elements may have optical powers resulting in the relationship of focal lengths, normalized for the corrector lens 140, ranging from 0.4 to −2.0 for the Mangin type lens refractive part 138, and 0.24 to −8.0 for the pupil lens 132, with the corrector lens 140 focal length being normalized to 1. Therefore, as an example, if the corrector lens 140 has a focal length of 10, the Mangin type lens refractive part 138 focal length should be within a range between 4 to −20.0 and the pupil lens 132 focal length should be within a range between 2.4 to −80.0.

The refractive lens elements may have refractive indices resulting in the relationship of refractive indices, normalized for the corrector lens 140, ranging from 0.4 to 1.0 for the Mangin type lens refractive part 138, and 0.4 to 1.3 for the pupil lens 132, with the corrector lens 140 being normalized to 1. Therefore, as an example, if the corrector lens 140 has a refractive index of 1, the Mangin type lens refractive part 138 refractive index will range between 0.4 to 1.0 and the pupil lens 132 refractive index will range between 0.4 to 1.3.

The refractive lens elements may have partial dispersions resulting in the relationship of partial dispersions, normalized for the corrector lens 140, ranging from 1.0 to 5.0 for the Mangin type lens refractive part 138, and 0.5 to 20 for the pupil lens 132, with the corrector lens 140 being normalized to 1. Therefore, as an example, if the corrector lens 140 has a partial dispersion of 10, the Mangin type lens refractive part 138 partial dispersion will range between 10.0 to 50.0 and the pupil lens 132 refractive index will range between 5.0 to 200.

When the refractive lens elements have a focal length within the ranges as indicated, it is possible to use a single optical material for all the elements, such as germanium. When all the refractive elements are made of the same material, the ratio of partial dispersions would be 1 to 1 to 1. In an embodiment where different refractive materials are used, the ratio between partial dispersions may preferably be 1 to 18 to 1.

Figure 4:
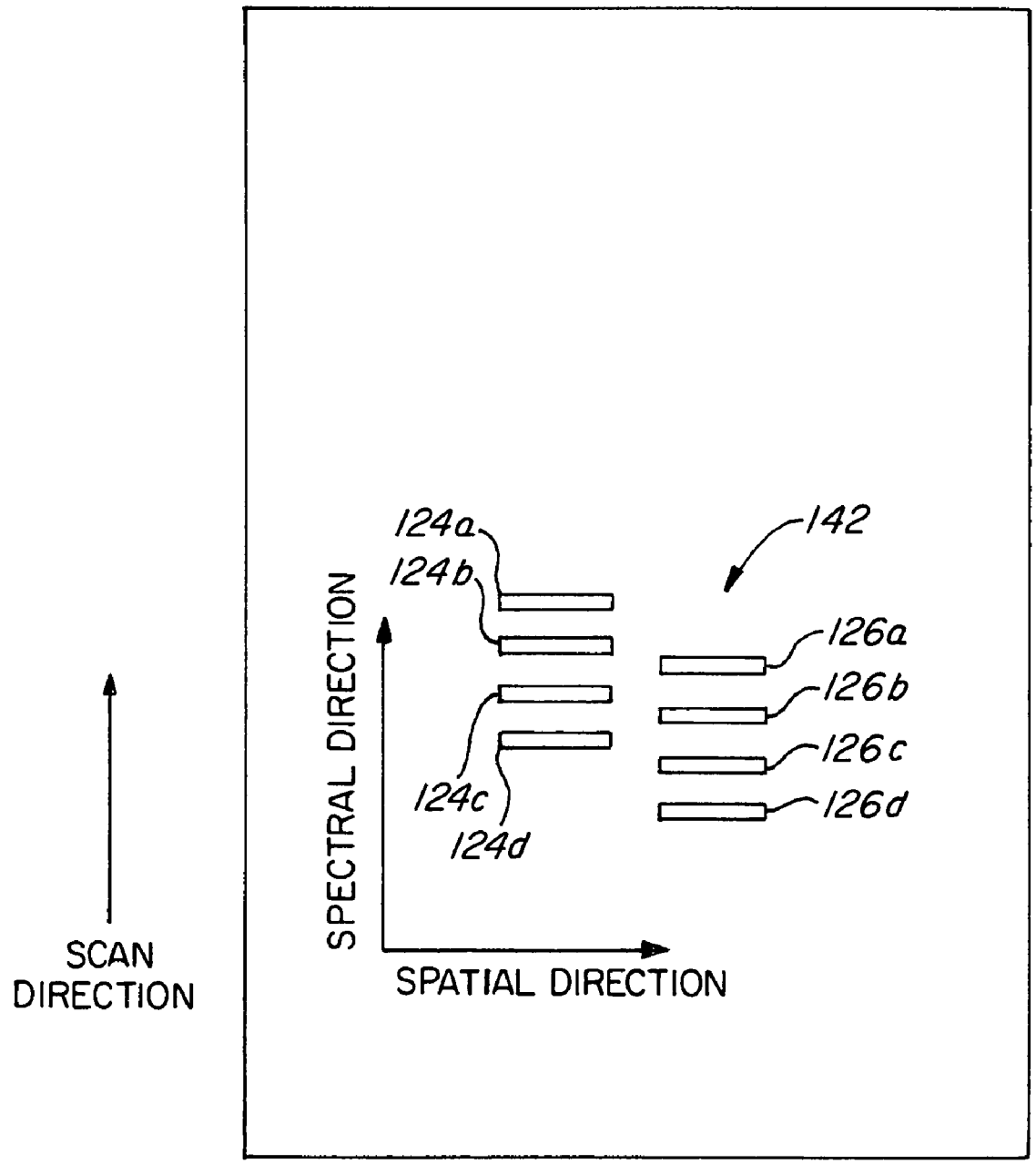
FIG. 4 is a plan view illustrating the focal plane adjacent the detectors resulting from the optical system illustrated in FIG. 3 and illustrating the different spectral components or separate wavelengths.

FIG. 4 is a plan view illustrating the focal or image plane 142 of the optical system illustrated in FIG. 3. The spectral components of the first slit 114, illustrated in FIG. 3, are imaged and represented by wavelength bands or lines 124*a-d*. The spectral components are separated by wavelength. Spectral components are imaged from the second aperture slit 116, illustrated in FIG. 3, and represented by wavelength bands or lines 126*a-d*. While only four spectral components or wavelength bands 124*a-d* and 126*a-d* for each slit are illustrated, there may be many different spectral components and FIG. 4 is only illustrative. The spectral components 124*a-d* and 126*a-d* are imaged on a detector array which may be similar to the detector array 22, illustrated in FIG. 2.

Figure 5:
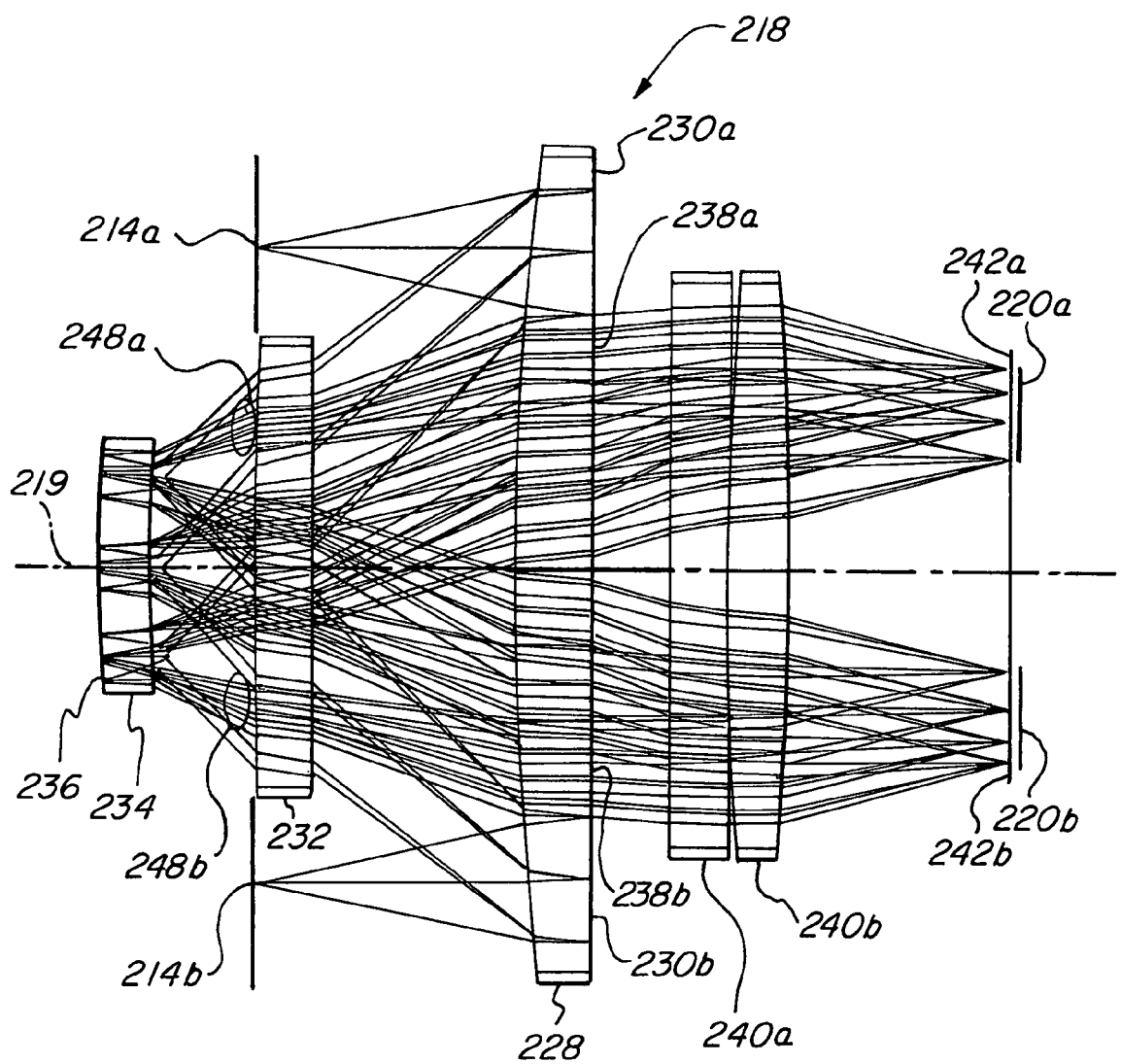
FIG. 5 schematically illustrates another embodiment of an imaging spectrometer illustrating aperture slits symmetrically positioned with respect to the optical axis.

FIG. 5 schematically illustrates another optical system 218 that provides a wide field of view and convenient packaging for an imaging spectrometer. In this embodiment, a first upper aperture slit 214*a* and a second lower aperture slit 214*b* are separated and decentered with respect to the optical axis 219. Electromagnetic radiation from the first upper aperture slit 214*a* is reflected from the first or upper reflective portion 230*a* of the Mangin type lens 228 and through the pupil lens 232 to the immersion diffraction grating 234. The immersion diffraction grating 234 diffracts electromagnetic radiation causing dispersion into different spectral components or wavelengths that are spatially separated. A negative diffraction order bundle 248*a* passes through the pupil lens 232 and the first or upper refractive portion 238*a* of the Mangin type lens 228. The electromagnetic radiation of the negative diffraction order bundle 248*a* then passes through both corrector lenses 240*a* and 240*b* to be imaged on the upper image or focal plane 242*a*. Accordingly, the image of the spectral components of the electromagnetic radiation arising from the negative diffraction order bundle 248*a* are imaged on the image or focal plane 242*a* and detected by first upper detector 220*a*. The first upper detector 220*a* may be a single detector such as a 256×256 pixel array or may be a detector array 22 as illustrated in FIG. 2. Similarly and symmetrically, a positive diffraction order bundle 248*b* diffracted from the immersion diffraction grating 234 is similarly transmitted through the optical system 218 to be imaged on the lower image or focal plane 242*b*. The lower image plane 242*b* images the positive diffraction order bundle 248*b* from the diffracted electromagnetic radiation onto a second lower detector 222*b*. Similarly, this detector may be a single large detector such as a 256×256 pixel or a detector array 22 as illustrated in FIG. 2. The optical system 218 of this embodiment is compact and lightweight and has relatively widely separated upper and lower image or focal planes 242*a* and 242*b*. Separating the focal planes is an advantage in some applications, and generally makes possible a more compact spectrometer. This embodiment may have an F number of 2.5 and may be enhanced to an F number of 2.2. This embodiment has a field of view that may typically be approximately 20.4 millimeters and can accommodate electromagnetic radiation in the range of 2.5 to 13.5 microns. Smile and keystone aberrations may be less than 0.1 pixels. Different wavelength bands may be utilized in the infrared. The refractive elements may be made of a single material such as germanium or one of the corrector lenses 240*a* or 240*b* may be made of zinc selenide, preferably corrector lens 240*b*, with the other refractive elements being made of germanium.

Figure 6:
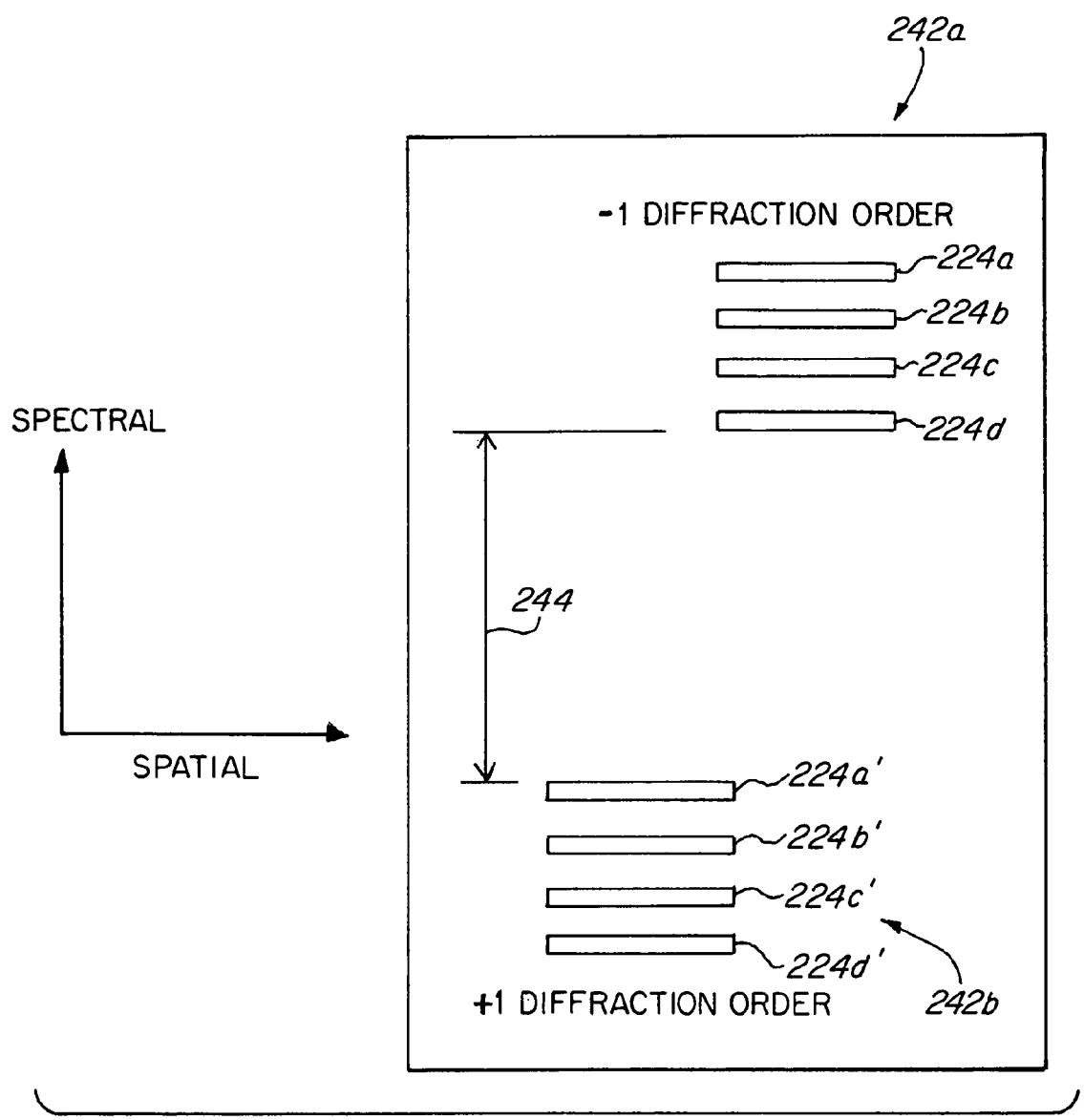
FIG. 6 is a plan view illustrating the focal plane adjacent the detectors resulting from the optical system illustrated in FIG. 5 and illustrating the different spectral components or separate wavelengths.

FIG. 6 is a plan view illustrating the separated upper image or focal plane 242*a* and the lower image or focal plane 242*b*. The upper and lower focal planes 242*a* and 242*b* are separated by a distance represented by arrow 244. The spectral components or spatially separated wavelengths are schematically illustrated as lines 224*a-d* and 224*a'-d'* for the upper image plane and the lower image plane 242*a* and 242*b*, respectively.

Figure 7:
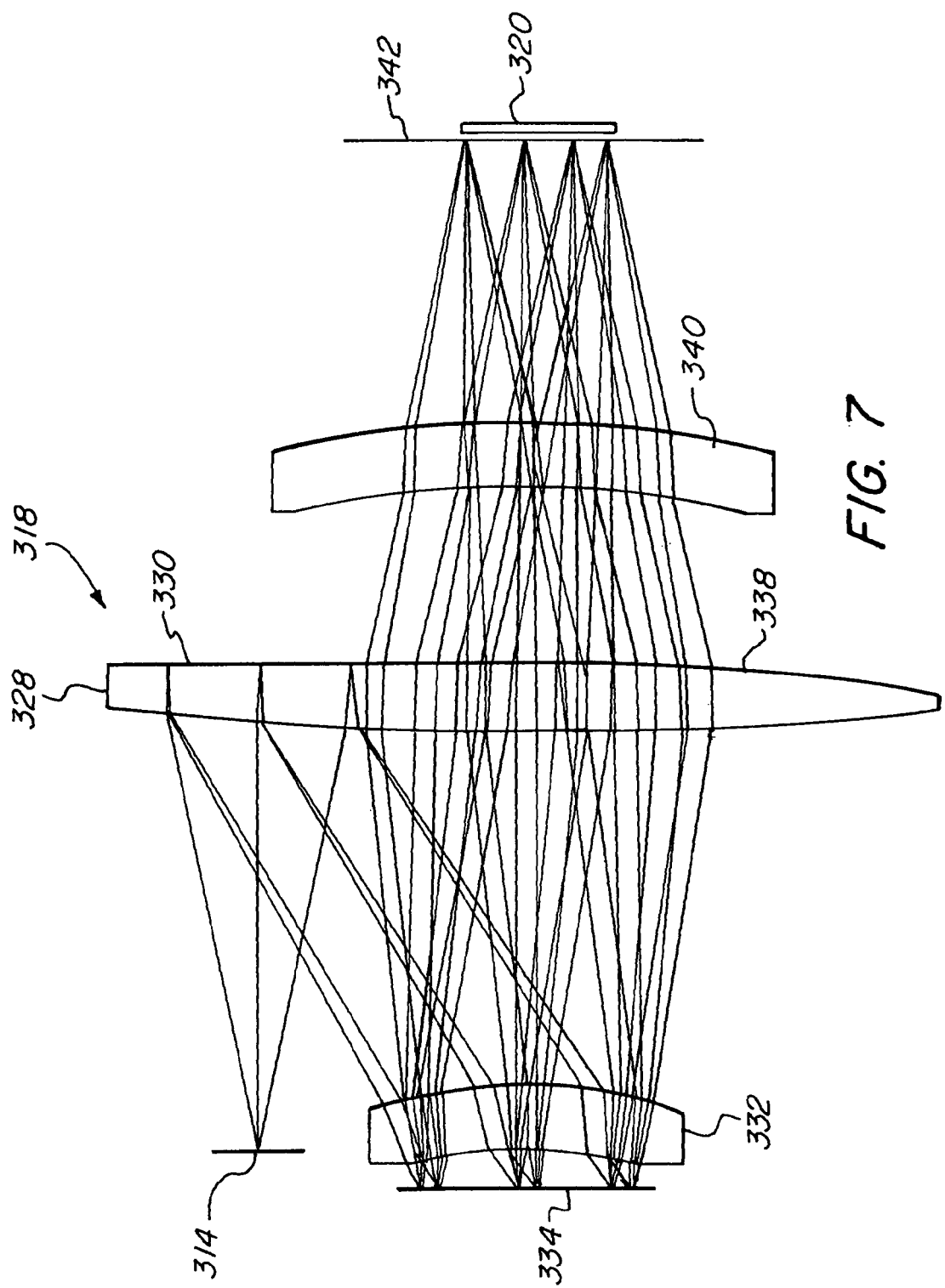
FIG. 7 schematically illustrates another embodiment of an imaging spectrometer optical system using a single aperture slit.

FIG. 7 schematically illustrates another optical system 318 for an imaging spectrometer. In this embodiment, a single aperture slit 314 is used. Electromagnetic radiation from the aperture slit 314 is reflected from the reflective portion 330 of a Mangin type lens 328. The reflected electromagnetic radiation passes through the pupil lens 332 onto a diffraction grating 334. The diffracted electromagnetic radiation passes again through the pupil lens 332 and through a refractive portion 338 of the Mangin type lens 328. The electromagnetic radiation then passes through the corrector lens 340 to be imaged on an image or focal plane 342 adjacent a detector 320. The detector 320 may be a detector array 22 as illustrated in FIG. 2 or may be a single large detector, for example 512×256 pixel detector. The refractive and reflective surfaces of the Mangin type lens 328 may have different curvatures. The pupil lens 332 may be a meniscus lens that bends toward the Mangin type lens 328. The correction lens 340 may bend toward the detector 320. By utilizing selected power ranges of the optical elements, a single optical material may be used, such as germanium. The pupil lens 332 aids in the balancing of optical powers permitting the use of a single optical material.

Figure 8:
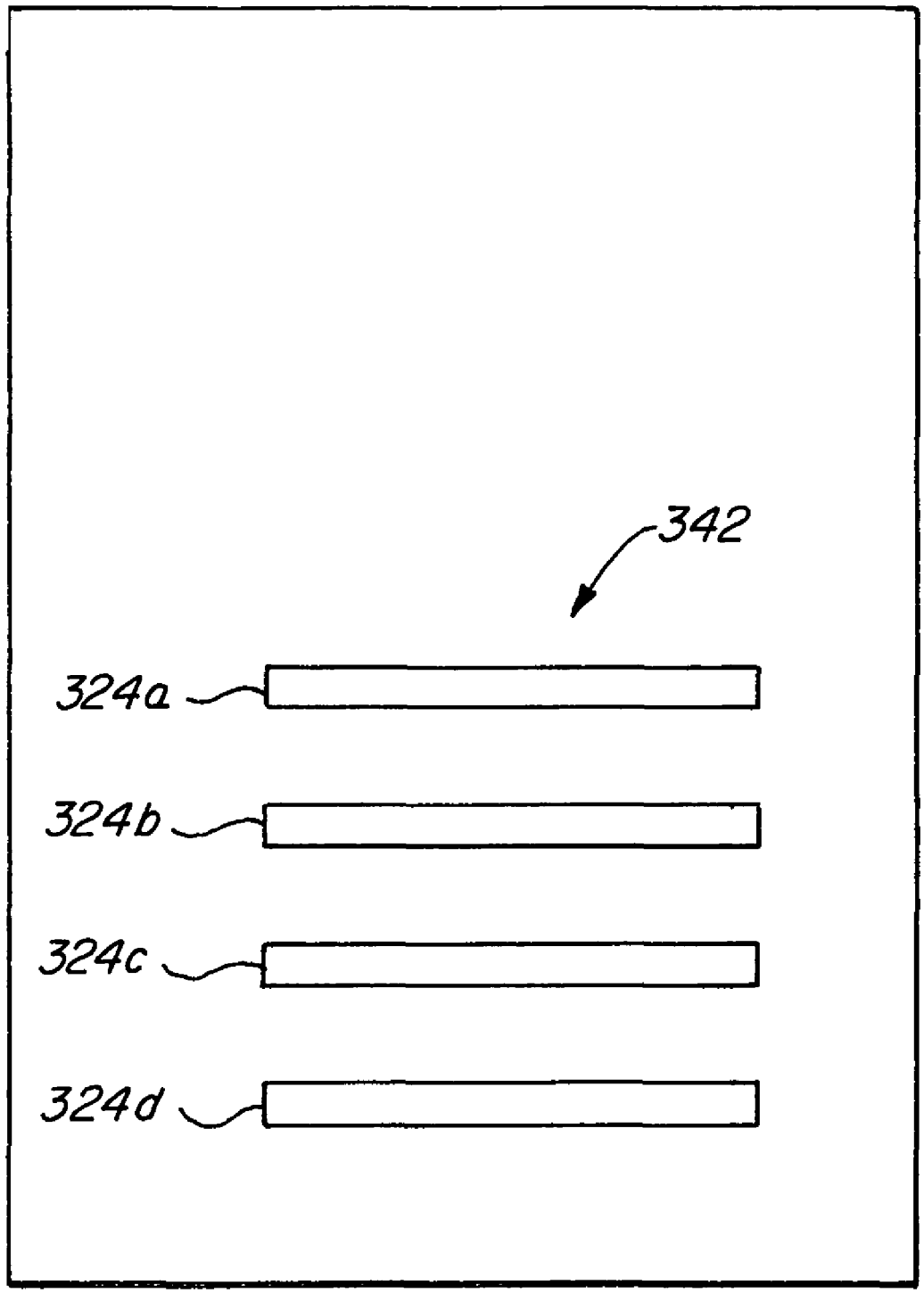
FIG. 8 is a plan view of the focal plane adjacent the detectors resulting from the optical system illustrated in FIG. 7 and illustrating the different spectral components or separate wavelengths.

FIG. 8 is a plan view illustrating the image or focal plane 342, resulting from the optical system 318 illustrated in FIG. 7. The spectral components or separate wavelengths are illustrated as wavelength bands or lines 324*a*-324*d*.

The present invention provides an optical system that has a larger field of view and higher throughput or lower F number than prior optical systems used in imaging spectrometers. The present invention permits substantially larger images with greater resolution and greater sensitivity or brightness than in prior optical systems used in imaging spectrometers. This increased performance is achieved in a simple, compact, and lightweight package that is no larger than prior systems.

Additionally, the present invention utilizes a detector system having staggered arrays that enhance the efficiency of the detector and permits the use of lower cost, smaller detectors placed in a staggered array in combination with signal processing to provide the effect of a larger detector at lower cost. Therefore, the present invention has many practical applications for remotely detecting the composition or constituent elements of an object based on the received light or electromagnetic radiation. For example, the composition of different gases such as those emitted by a factory may be readily identified. Additionally, the spectrometer may be used to scan geographic regions to identify personnel, equipment, or plant life. These are only a few examples of the usefulness of the present invention.

Although the preferred embodiments have been illustrated and described, it will be obvious to those skilled in the art that various modifications may be made without departing from the spirit and scope of this invention.

What is claimed is:

1. A compact imaging spectrometer having enhanced efficient detectors comprising: an aperture slit; an optical system forming spectral components of electromagnetic radiation received by said aperture slit, wherein said optical system comprises a Mangin type lens having a reflective portion and a refractive portion, a pupil lens, a diffraction grating, and a corrector lens positioned wherein said aperture slit transmits electromagnetic radiation to the reflective portion of the Mangin type lens and the reflective portion directs electromagnetic radiation onto the pupil lens, the pupil lens directs electromagnetic radiation onto the diffraction grating, the diffraction grating directs electromagnetic radiation onto the pupil lens, the pupil lens directs electromagnetic radiation onto the refractive portion of the Mangin type lens, and the refractive portion of the Mangin lens directs electromagnetic radiation onto the corrector lens, a plurality of detectors in a common plane forming a staggered detector array with spaces there between in a direction perpendicular to an optical axis of said optical system and positioned to receive electromagnetic radiation from the corrector lens; means for scanning an image of the spectral components in a field larger than the staggered detector array over the staggered detector array; and signal processing means, coupled to the staggered detector array, for processing signals from the staggered detector array and forming a composite representation of the larger field containing the spectral components, whereby the plurality of detectors effectively form a larger detector area.

2. A compact imaging spectrometer having enhanced efficient detectors as in claim 1 wherein:
said plurality of detectors form a checkerboard pattern.

3. A compact imaging spectrometer having enhanced efficient detectors as in claim 1 wherein:
the image of the spectral components are scanned onto the staggered detector array.

4. A compact imaging spectrometer comprising:
at least one aperture slit;
a Mangin type lens comprising a reflective portion and a refractive portion;
a pupil lens;
a diffraction grating; and
a detector,
said aperture slit, Mangin type lens, pupil lens, diffraction grating, and detector are positioned wherein said aperture slit transmits electromagnetic radiation to the reflective portion of said Mangin type lens and the reflective portion directs the electromagnetic radiation onto said pupil lens, said pupil lens directs the electromagnetic radiation onto said diffraction grating, said diffraction grating directs electromagnetic radiation onto the pupil lens, said pupil lens directs electromagnetic radiation onto the refractive portion of said Mangin type lens, the refractive portion of said Mangin type lens directs electromagnetic radiation onto said detector,
whereby spectral components of the electromagnetic radiation are detected and the composition of an object may be determined.

5. A compact imaging spectrometer as in claim 4 wherein:
said at least one aperture slit comprises two aperture slits separated in two directions.

6. A compact imaging spectrometer as in claim 4 wherein:
said grating comprises an immersion grating.

7. A compact imaging spectrometer as in claim 4 wherein:
said grating comprises a reflective grating.

8. A compact imaging spectrometer as in claim 4 wherein:
said pupil lens comprises a meniscus bent towards said Mangin type lens.

9. A compact imaging spectrometer as in claim 4 further comprising:
a corrector lens placed between said Mangin type lens and said detector.

10. A compact imaging spectrometer as in claim 9 wherein:
said corrector lens bends towards said detector.

11. A compact imaging spectrometer as in claim 9 further comprising:
another corrector lens placed adjacent said corrector lens.

12. A compact imaging spectrometer as in claim 11 wherein:
said another corrector lens is made of a material different from said corrector lens.

13. A compact imaging spectrometer as in claim 9 wherein:
the focal lengths, normalized for said corrector lens, ranges from 0.4 to −2.0 for the refractive portion of said Mangin type lens, and 0.24 to −8.0 for said pupil lens, and wherein said corrector lens is normalized to 1.

14. A compact imaging spectrometer as in claim 9 wherein:
the relationship of the focal lengths between said Mangin type lens, said pupil lens, and said corrector lens are selected so as to permit use of the same material for said Mangin type lens, said pupil lens, and said corrector lens.

15. A compact imaging spectrometer as in claim 13 wherein:
the refractive portion of said Mangin type lens, said pupil lens, and said corrector lens are made of the same material.

16. A compact imaging spectrometer as in claim 15 wherein:
the same material comprises germanium.

17. A compact imaging spectrometer as in claim 9 wherein:
the focal lengths, normalized for said corrector lens, ranges from 0.4 to −2.0 for the refractive portion of said Mangin type lens, and 0.24 to −8.0 for said pupil lens 132, wherein said corrector lens is normalized to 1;
the refractive indices, normalized for the corrector lens, ranges from 0.4 to 1 for the refractive portion of said Mangin type lens, and 0.4 to 1.3 for said pupil lens, wherein said corrector lens is normalized to 1;
the partial dispersions, normalized for said corrector lens, ranges from 1.0 to 5.0 for the refractive portion of said Mangin type lens, and 0.5 to 20.0 for said pupil lens, wherein said corrector lens is normalized to 1.

18. A compact imaging spectrometer as in claim 17 wherein;
the relative relationship of partial dispersions between the refractive portion of said Mangin type lens, said pupil lens, and said corrector lens is 1 to 18 to 1.

19. A compact imaging spectrometer as in claim 4 wherein:
said detector comprises a plurality of detectors forming a staggered detector array.

20. A symmetrical wide field compact imaging catadioptric spectrometer comprising: a first aperture slit; a second aperture slit; a Mangin type lens comprising a first reflective portion and a first refractive portion and a second reflective portion and a second refractive portion; a pupil lens; a diffraction grating; a first detector; and a second detector; wherein the first and second aperture slits are separated and decentered with respect to the optical axes and said first and second aperture slit, Mangin type lens, pupil lens, and diffraction grating are positioned so that the first aperture slit transmits electromagnetic radiation to the first reflective portion of said Mangin type lens and the first reflective portion directs electromagnetic radiation onto said pupil lens, said pupil lens directs electromagnetic radiation onto said diffraction grating, said diffraction grating directs electromagnetic radiation onto the first refractive portion of said Mangin type lens, the first refractive portion directs electromagnetic radiation from a negative diffraction order onto said first detector and the second aperture slit transmits electromagnetic radiation to the second reflective portion of said Mangin type lens and the second reflective portion directs electromagnetic radiation onto said pupil lens, said pupil lens directs electromagnetic radiation onto said diffraction grating, said diffraction grating directs electromagnetic radiation onto the second refractive portion of said Mangin type lens, and the second refractive portion directs electromagnetic radiation from a positive diffraction order onto said second detector.

21. A symmetrical wide field compact imaging catadioptric spectrometer as in claim 20 further comprising:
a corrector lens placed between said Mangin type lens and said first and second detectors.

22. A symmetrical wide field compact imaging catadioptric spectrometer as in claim 21 further comprising:
another corrector lens placed adjacent said corrector lens.

23. A symmetrical wide field compact imaging catadioptric spectrometer as in claim 22 wherein:
said another corrector lens is made of a material different from said corrector lens.

24. A symmetrical wide field compact imaging catadioptric spectrometer as in claim 21 wherein:
said Mangin type lens, pupil lens, and corrector lens are made of the same material.

25. A symmetrical wide field compact imaging catadioptric spectrometer as in claim 24 wherein:
the same material is germanium.

26. A symmetrical wide field compact imaging catadioptric spectrometer comprising:
a first aperture slit;
a second aperture slit;
a Mangin type lens comprising a first reflective portion and a first refractive portion and a second reflective portion and a second refractive portion;
a pupil lens;
a diffraction grating;
a corrector lens
a first detector; and
a second detector;
wherein from said first and second aperture slits to the image planes at said first and second detectors, the electromagnetic radiation enters said first and second aperture slits and is respectively reflected from the first and second reflective portions of said Mangin type lens, transmitted through said pupil lens, diffracted by said diffraction grating, re-transmitted through said pupil lens, transmitted respectively through the first and second refractive portions of said Mangin type lens, transmitted through said corrector lens, and respectively imaged on said first and second detectors, and
wherein the first and second aperture slits and said first and second detectors are both separated and decentered about the optical axes and electromagnetic radiation from a negative diffraction order is imaged on said first detector and electromagnetic radiation from a positive diffraction order is imaged on said second detector.

27. A symmetrical wide field compact imaging catadioptric spectrometer as in claim 26 wherein:
the focal lengths, normalized for said corrector lens, ranges from 0.4 to −2.0 for the first and second refractive portion of said Mangin type lens, and 0.24 to −8.0 for said pupil lens 132, wherein said corrector lens is normalized to 1;
the refractive indices, normalized for the corrector lens, ranges from 0.4 to 1 for the first and second refractive portion of said Mangin type lens, and 0.4 to 1.3 for said pupil lens, wherein said corrector lens is normalized to 1;
the partial dispersions, normalized for said corrector lens, ranges from 1.0 to 5.0 for the first and second refractive portion of said Mangin type lens, and 0.5 to 20.0 for said pupil lens, wherein said corrector lens is normalized to 1.

28. A symmetrical wide field compact imaging catadioptric spectrometer as in claim 26 wherein:
the balance of powers between the first reflective portion, the first refractive portion, said pupil lens, and said corrector lens is selected such that a single optical material is used for the first refractive portion, said pupil lens, and said corrector lens.

29. A symmetrical wide field compact imaging catadioptric spectrometer as in claim 28 wherein:
the single optical material is germanium.

30. A symmetrical wide field compact imaging catadioptric spectrometer as in claim 26 further comprising:
another corrector lens placed adjacent said corrector lens.

31. A symmetrical wide field compact imaging catadioptric spectrometer as in claim 30 wherein:
said another corrector lens is made of a different material than said corrector lens.

32. A symmetrical wide field compact imaging catadioptric spectrometer as in claim 31 wherein:
the different material comprises zinc selenide.

33. A compact imaging spectrometer comprising:
at least one aperture slit;
a Mangin type lens comprising a reflective portion and a refractive portion;
a pupil lens;
a diffraction grating;
a corrector lens; and
a detector,
said aperture slit, Mangin type lens, pupil lens, diffraction grating, corrector lens, and detector are positioned wherein said aperture slit transmits electromagnetic radiation to the reflective portion of said Mangin type lens and the reflective portion directs the electromagnetic radiation onto said pupil lens, said pupil lens directs the electromagnetic radiation onto said diffraction grating, said diffraction grating directs electromagnetic radiation onto the pupil lens, said pupil lens directs electromagnetic radiation onto the refractive portion of said Mangin type lens, the refractive portion of said Mangin type lens directs electromagnetic radiation onto said corrector lens, and said corrector lens directs electromagnetic radiation onto said detector, wherein the optical powers, refractive indices, and partial dispersions of the refractive portion of said Mangin type lens and said pupil lens are normalized for said corrector lens, whereby spectral components of the electromagnetic radiation are detected and the composition of an object may be determined in a wide field.

* * * * *